(12) United States Patent
Berry et al.

(10) Patent No.: US 11,519,404 B2
(45) Date of Patent: Dec. 6, 2022

(54) DETERMINING A FATIGUE CONDITION OF A HYDRAULIC SYSTEM

(71) Applicant: Hamilton Sundstrand Corporation, Charlotte, NC (US)

(72) Inventors: Erin E. Berry, Roscoe, IL (US); Edward W. Goy, Crystal Lake, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 273 days.

(21) Appl. No.: 16/751,973

(22) Filed: Jan. 24, 2020

(65) Prior Publication Data

US 2021/0231118 A1    Jul. 29, 2021

(51) Int. Cl.
*F04B 51/00* (2006.01)
*G01L 9/04* (2006.01)

(52) U.S. Cl.
CPC ............... *F04B 51/00* (2013.01); *G01L 9/04* (2013.01)

(58) Field of Classification Search
None
See application file for complete search history.

(56) References Cited

U.S. PATENT DOCUMENTS

| 5,415,489 A | 5/1995 | Hutchins et al. |
| 6,071,408 A | 6/2000 | Allington et al. |
| 2005/0019180 A1 | 1/2005 | Seto et al. |
| 2006/0196252 A1* | 9/2006 | Deckard ............... F16L 25/01 73/49.5 |
| 2010/0143155 A1 | 6/2010 | Preiswerk et al. |
| 2010/0174576 A1 | 7/2010 | Naylor |
| 2017/0138142 A1 | 5/2017 | Leach et al. |
| 2018/0075713 A1* | 3/2018 | Henson ............... G08B 5/36 |
| 2020/0400051 A1* | 12/2020 | Henson ............ F01M 13/0011 |

FOREIGN PATENT DOCUMENTS

| DE | 102017214845 A1 | 2/2019 |
| EP | 1832798 A1 | 9/2007 |
| WO | WO-2006070700 A1 * | 7/2006 ......... G01M 5/0033 |

OTHER PUBLICATIONS

Extended European Search Report dated May 10, 2021, received for corresponding European Application No. 20212304.8, 6 pages.

* cited by examiner

*Primary Examiner* — Lina M Cordero
(74) *Attorney, Agent, or Firm* — Kinney & Lange, P.A.

(57) ABSTRACT

Apparatus and associated methods relate to monitoring health of a hydraulic system. A method includes monitoring pressure within the system and determining when a potential fatigue condition may occur based on counting the number of times pressure in the system has exceeded the at least one threshold. In some embodiments, strain cycle data is calculated based on a time sequence of signals generated by a hydraulic fitting, which is indicative of strain of the hydraulic fitting. An output signal indicative of the fatigue condition determined is generated. In some embodiments, the strain data includes a number of strain cycles that the time sequence of signals crosses from below a strain threshold to above the strain threshold.

16 Claims, 4 Drawing Sheets

DETERMINING A FATIGUE CONDITION OF A HYDRAULIC SYSTEM

BACKGROUND

Hydraulic systems can experience fatigue in response to dynamic strain conditions. For example, piston pumps can cause pump pressure relations that have periodic or pseudo periodic temporal behaviors. Such cyclic pressures can cause parts exposed thereto to be fatigued, which in turn can cause such parts to crack, soften, harden, or otherwise change condition. Furthermore, if a hydraulic system experiences a failure or condition that causes overpressure conditions in the hydraulic fluid, components of the hydraulic system that are exposed to such overpressure conditions can be weakened or can fail. Therefore, a system that predicts the fatigue condition of hydraulic system components based on sensed strain is needed.

SUMMARY

The present disclosure generally relates to a method for evaluating a fatigue condition of a hydraulic system that includes a hydraulic fitting. The method includes the steps of monitoring pressure within the system, counting the number of times pressure in the system has exceeded at least one threshold, and determining when a potential fatigue condition may occur based on the number of times pressure in the system has exceeded the at least one threshold.

The present disclosure also generally relates to a system for evaluating a fatigue condition of a hydraulic system that includes a hydraulic fitting. The system includes a strain gauge affixed to the hydraulic fitting and configured to monitor pressure within the system, and a controller configured to count a number of times pressure in the system has exceeded at least one threshold and determine when a potential fatigue condition may occur based on the number of times pressure in the system has exceeded the at least one threshold.

DETAILED DESCRIPTION

A system and associated methods relating to evaluating a fatigue condition of a hydraulic system are provided. A strain gauge affixed to a hydraulic fitting on the hydraulic system is configured to generate a time sequence of signals indicative of strain of the hydraulic fitting. Strain cycle data is calculated based on the time sequence of signals indicative of strain of the hydraulic fitting. It is known to those skilled in the hydraulic art that hydraulic system pressure, and pressure transients, can cause strain on components within the hydraulic system. Strain related to pressure that is sensed at the hydraulic fitting is indicative of pressure transients experienced by components in the hydraulic system. Non-limiting examples of components within a hydraulic system that can experience fatigue from pressure transients include pumps, pump covers, manifolds, hoses, tubing, piping, valves, and cylinders. Monitoring the history of strain that a hydraulic fitting is subjected to can provide an indication of when preventive and/or corrective maintenance on various components in the hydraulic system may be required. This can be referred to as a fatigue condition. Accordingly, strain cycle data can provide an indication of pressure transients that an associated hydraulic system is subjected to. The hydraulic system can also be referred to as a hydraulic network. The fatigue condition is determined based on the strain cycle data calculated. An output signal indicative of the fatigue condition determined is generated. In some embodiments, the strain data includes several strain cycles that the time sequence of signals crosses from below a strain threshold to above the strain threshold.

Figure 1:
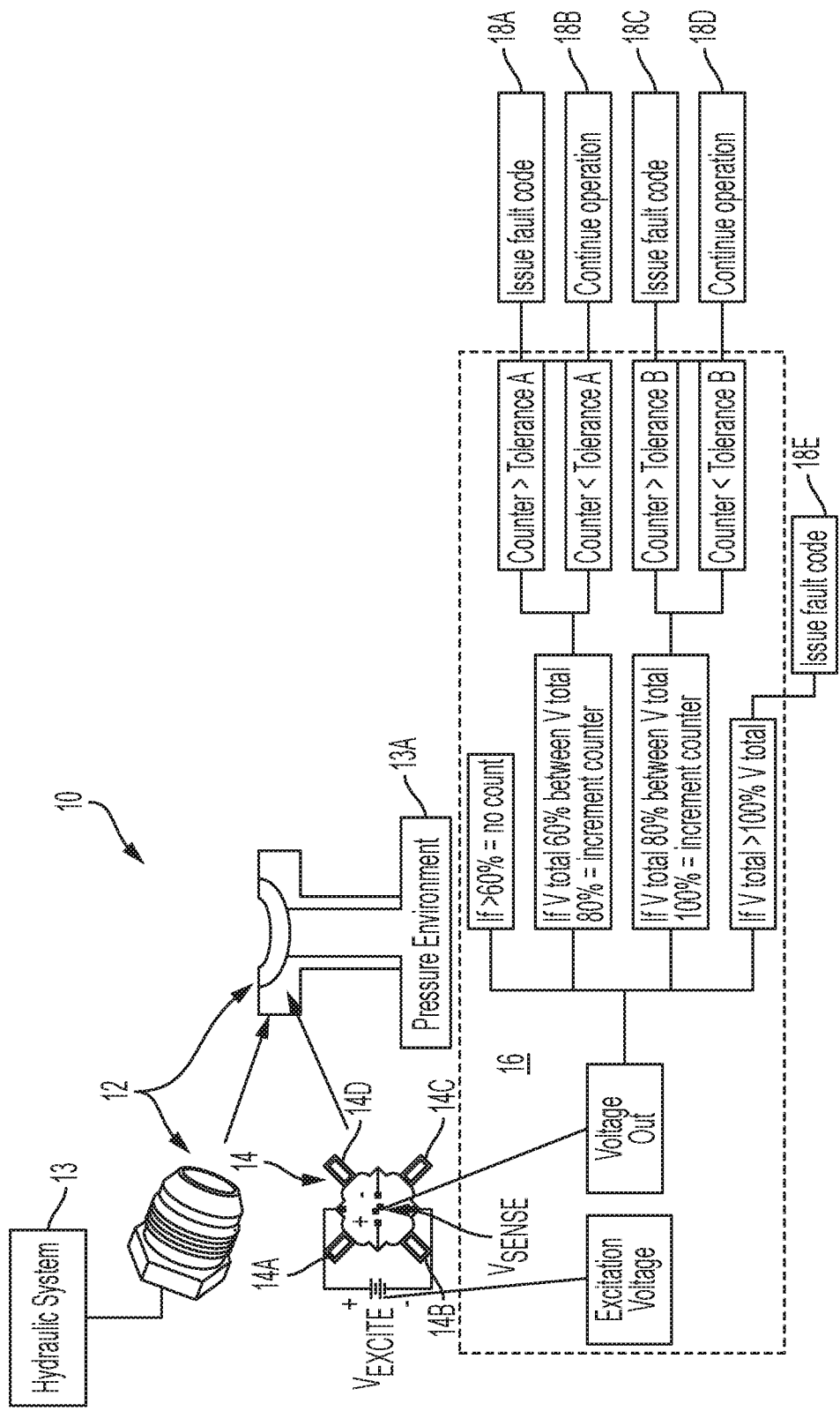
FIG. 1 is a schematic diagram of a system for evaluating a fatigue condition of a hydraulic fitting.

FIG. 1 is a schematic diagram of a system for evaluating a fatigue condition of a hydraulic fitting, and therefore, of pressure transients that components in an associated hydraulic system are subjected to. In FIG. 1, system 10 includes hydraulic fitting 12, hydraulic system 13, and controller 16. Hydraulic fitting 12 has strain gauge 14 attached thereto. In the depicted embodiment, strain gauge 14 is a full-bridge strain gauge that includes strain gauge transducers 14A-14D arranged in a Wheatstone Bridge configuration. Controller 16 provides an excitation voltage $V_{EXCITE}$ to strain gauge 14 and receives sensor signal $V_{SENSE}$ from strain gauge 14. Sensor signal $V_{SENSE}$ is indicative of strain of hydraulic fitting 12 sensed at a location of hydraulic fitting 12 to which strain gauge 14 is attached. Strain sensed at hydraulic fitting 12 is indicative of pressure transients that components of hydraulic system 13 experience, depicted as pressure environment 13A.

Controller 16 generates, based on the received signal $V_{SENSE}$, an output signal indicative of various fatigue conditions 18A-18E of hydraulic fitting 12, and accordingly, of hydraulic system 13. In the depicted embodiment, controller 16 determines these various fatigue conditions based on the strain cycle data. Strain cycle data are metrics of sensor signal $V_{SENSE}$, which are related to temporal cycles of strain experienced by hydraulic fitting 12. Cycles of strain can be determined in various manners. The hydraulic fluid communicated by hydraulic fitting 12 can be under temporal cycles of pressure. When the pressure of the hydraulic fluid is high, hydraulic fitting 12 can experience high strain, and when the pressure of hydraulic fluid is low, hydraulic fitting 12 can experience low strain. The temporal cycle of pressure in the hydraulic fluid causes a corresponding temporal cycle of strain in hydraulic fitting 12. Each temporal cycle of strain can cause fatigue in hydraulic fitting 12. Thus, fatigue increases with increasing numbers of strain cycles, and with increasing intensities of maxima of these strain cycles.

As depicted in FIG. 1, both count of strain cycles and intensities of maxima of these strain cycles are used to determine the fatigue condition of hydraulic fitting 12. In the depicted embodiment, controller 16 counts the numbers of strain cycles that have maxima greater than 60%, 80%, and 100% of a threshold strain value. In response to a count of strain cycles having maxima greater than 60% of the threshold strain value exceeding a first count threshold A, controller 16 generates an output signal that is indicative of fault code 18A. In response to a count of strain cycles having maxima greater than 80% of the threshold strain value exceeding a second count threshold B, controller 16 generates an output signal that is indicative of fault code 18C. In response to a strain cycle having a maximum greater than 100% of the threshold strain value, controller 16 generates an output signal that is indicative of fault code 18E.

Each of the fault codes generated for fatigue conditions 18A, 18C, and 18E can be indicative of a caution, a warning, or an alarm. For example, the fault code corresponding to fatigue condition 18A might indicate a request for maintenance. The fault code corresponding to fatigue condition 18C might indicate a request for component replacement. The fault code corresponding to fatigue condition 18E might indicate a shut-down condition. Fatigue conditions 18B and 18D might be simply indicative of continued operation, or perhaps of a current count of strain cycles having maxima greater than 60% and 80%, respectively, of the threshold strain. The fault codes of 18A, 18C, and 18E can similarly include indicia of a current count of strain cycles having maxima greater than 60%, 80%, and 100%, respectively, of the threshold strain.

Figure 2:
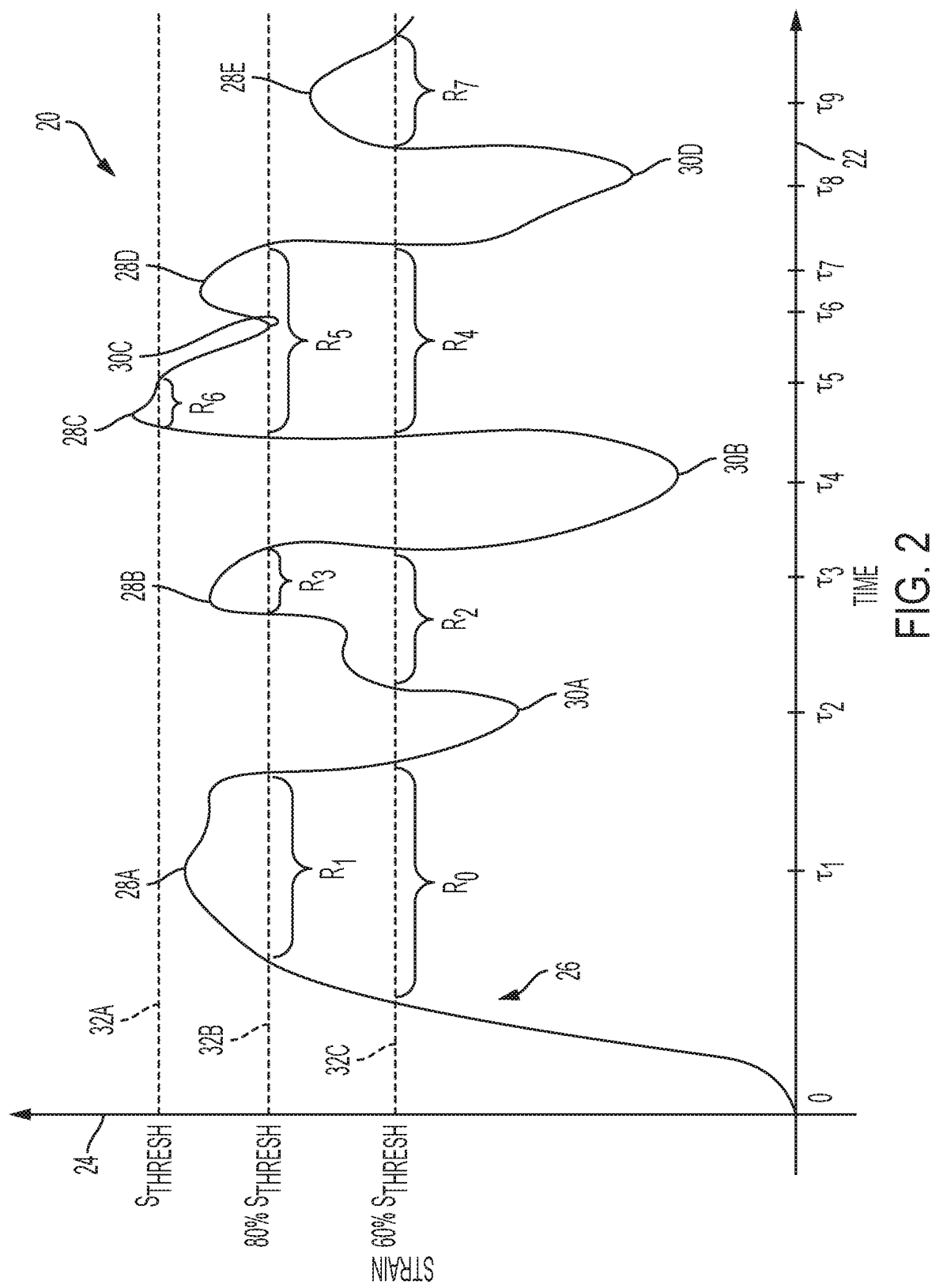
FIG. 2 is a graph of a time sequence of signals indicative of strain of the hydraulic fitting.

FIG. 2 is a graph of a time sequence of signals indicative of strain of the hydraulic fitting, and therefore, on an associated hydraulic system. In FIG. 2, graph 20 includes horizontal axis 22, vertical axis 24 and strain/time relation 26. Horizontal axis 22 is indicative of time, and vertical axis 24 is indicative of strain as measured by strain gauge 14 (depicted in FIG. 1). Strain/time relation 26 can be an analog signal or a digital signal. Strain/time relation 26 can be a continuous signal or a signal sampled at discreet times. In the FIG. 2 depiction, strain/time relation 26 is a continuous analog signal. Strain/time relation 26 is indicative of pressure environment 13A that is experienced by components of hydraulic system 13 depicted in FIG. 1.

Strain/time relation exhibits various maxima 28A-28E and minima 30A-30D. Strain reference lines 32A, 32B, and 32C correspond to 60%, 80% and 100%, respectively, of threshold strain $S_{THRESH}$. Strain/time relation 26 shows strain at zero at time zero, and then increasing to first strain maximum 28A at time $\tau_1$. Strain/time relation 26 then decreases from first strain maximum 28A to first strain minimum 30A at time $\tau_2$. Strain/time relation 26 then proceeds through a series of strain maxima and minima 28B, 30B, 28C, 30C, 28D, 30D, and 28E at times $\tau_3$, $\tau_4$, $\tau_5$, $\tau_6$, $\tau_7$, $\tau_8$, and $\tau_9$, respectively.

The fatigue condition of hydraulic fitting 12 can be predicted based on strain/time relation 26. For example, hydraulic fitting 12 can be fatigued each strain cycle exhibited in graph 20. Various ways of determining strain cycle data based on strain/time relation 26 can be used for determining the fatigue condition of hydraulic fitting 12. For example, in one embodiment, contiguous ranges R0-R7 of strain/time relation 26, which are greater than one or more of strain reference lines 32A, 32B, and 32C, can be determined. A count of the number of times these ranges R0-R7 of strain/time relation 26 crosses its respective strain reference line 32A-32C in an increasing direction can be maintained. For example, strain/time relation 26 crosses strain reference 32C in an increasing direction four times—throughout ranges R0, R2, R4, and R7. Strain/time relation 26 crosses strain reference 32B in an increasing direction three times—throughout ranges R1, R3, and R5. Strain/time relation 26 crosses strain reference 32A in an increasing direction only one time—throughout range R6. If any of these counts 4, 3, and 1, exceeds a threshold count limit for hydraulic fitting 12, then controller 16 can generate a fault signal indicating such count limit being exceeded. When evaluating strain/time relation 26 of graph 20, crossing strain reference line 32A, 32B, 32C can also be referred to as crossing from below a particular strain threshold to above the particular strain threshold, or as exceeding the respective strain threshold.

In another embodiment, differences between adjacent pairs of maxima and minima 28A/30A, 28B/30A, 28B/30B, 28C/30B, 28C/30C, 28D/30C, 28D/30D, and 28E/30D can be used to determine the fatigue condition of hydraulic fitting 12, and accordingly, of various components of hydraulic system 13. For example, differences in the strain between these minima/maxima pairs can be used to calculate a fatigue value associated therewith. These calculated fatigue values can then be added to obtain a summed fatigue value. If this summed fatigue value exceeds a fatigue value threshold, controller 16 can generate a fault signal indicating such fatigue value threshold being exceeded. Adjacent pairs of maxima and minima 28A/30A, 28B/30A, 28B/30B, 28C/30B, 28C/30C, 28D/30C, 28D/30D, and 28E/30D can be referred to as subsets of the time sequence of signals indicative of strain of the hydraulic fitting. In some embodiments, two or more contiguous subsets of the time sequence of signals can be evaluated by controller 16.

In another embodiment, the slope of strain/time relation 26 can be calculated. The slope calculated can then be weighted by a fatigue value function $f(\text{strain}, \text{slope})$ of the strain and the slope calculated. This fatigue value function $f(\text{strain}, \text{slope})$ can then be integrated to determine integrated fatigue value. If this integrated fatigue value exceeds a fatigue value threshold, controller 16 can generate a fault signal indicating such fatigue value threshold being exceeded.

Figure 3:
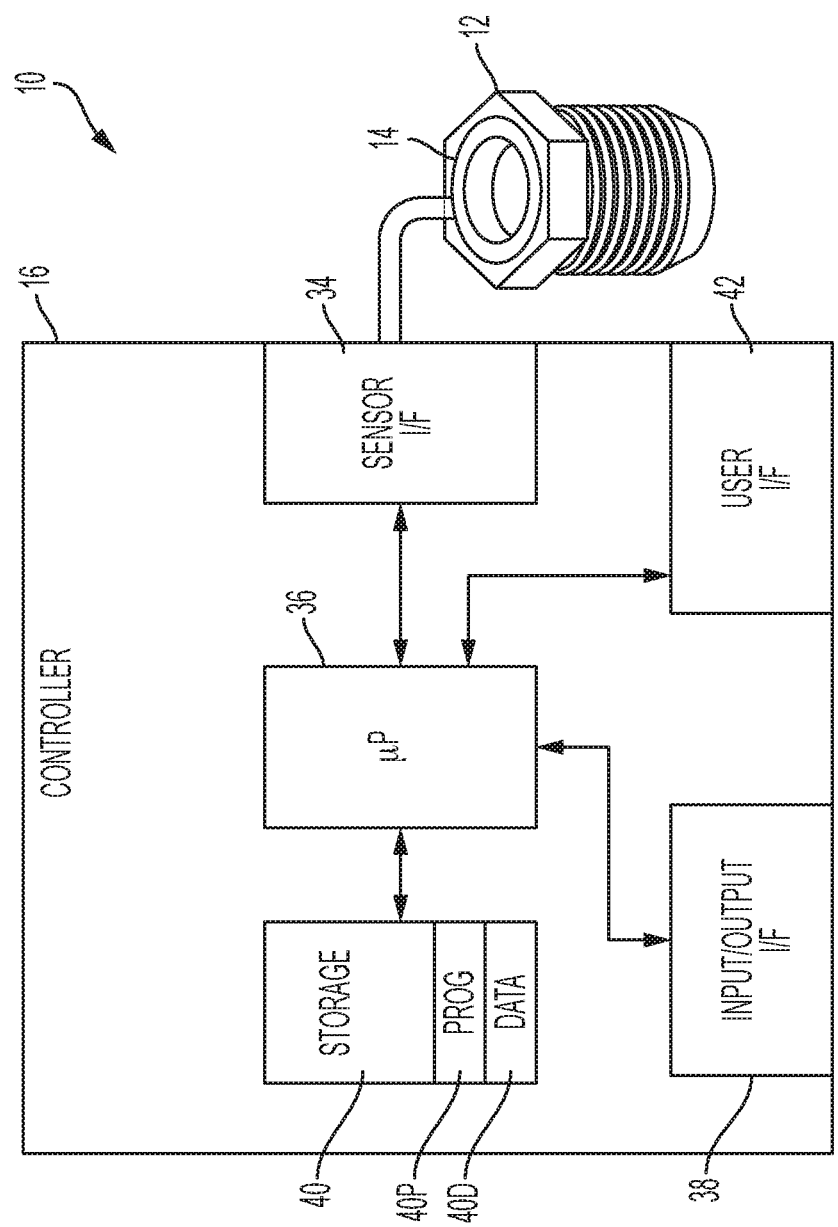
FIG. 3 is a block diagram of a system for evaluating a fatigue condition of a hydraulic fitting.

FIG. 3 is a block diagram of system 10 shown in FIG. 1 for evaluating a fatigue condition of hydraulic fitting 12, and therefore, of associated hydraulic system 13 (not shown in FIG. 3). In FIG. 3, system 10 includes upstream hydraulic fitting 12, strain gauge 14, and controller 16. System 10 can also be referred to as a hydraulic-fitting fatigue determination system. Controller 16 includes sensor interface 34, processor 36, input/output interface 38, storage device(s) 40, and user interface 42. Processor 36 can receive program instructions 40P from storage device(s) 40. Processor 36 can be configured to determine a fatigue condition of hydraulic fitting 12, based on signals received from and generated by strain gauge 14 using program instructions 40P retrieved from storage device(s) 40. For example, processor 36 can be configured to receive signals, via sensor interface 34, indicative of strain sensed.

As illustrated in FIG. 3, controller 16 includes processor 36, input/output interface 38, storage device(s) 40, and sensor interface 34. However, in certain examples, system 10 can include more or fewer components. For instance, in some embodiments, system 10 can include additional hydraulic fittings equipped with strain gauges. In some examples, system 10 can be performed in one of computational systems, such as, for example, an existing Full Authority Digital Engine Controller (FADEC) of an aircraft.

Processor 36, in one example, is configured to implement functionality and/or process instructions for execution within system 10. For instance, processor 36 can be capable of processing instructions stored in storage device(s) 40. Examples of processor 36 can include any one or more of a microprocessor (µP), a controller, a digital signal processor (DSP), an application specific integrated circuit (ASIC), a field-programmable gate array (FPGA), or other equivalent discrete or integrated logic circuitry. Processor 36 can be configured to determine various airstream conditions.

Storage device(s) 40 can be configured to store information within system 10 during operation. Storage device(s) 40, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 40 is a temporary memory, meaning that a primary purpose of storage device(s) 40 is not long-term storage. Storage device(s) 40, in some examples, is described as volatile memory, meaning that storage device(s) 40 do not maintain stored contents when power to system 10 is turned off. Examples of volatile memories can include random access memories (RAM), dynamic random-access memories (DRAM), static random-access memories (SRAM), and other forms of volatile memories. In some examples, storage device(s) 40 is used to store program instructions for execution by processor 36. Storage device(s) 40, in one example, is used by software or applications running on system 10 (e.g., a software program calculating fatigue conditions of various hydraulic fittings).

Storage device(s) 40, in some examples, can also include one or more computer-readable storage media. Storage device(s) 40 can be configured to store larger amounts of information than volatile memory. Storage device(s) 40 can further be configured for long-term storage of information. In some examples, storage device(s) 40 include non-volatile storage elements. Examples of such non-volatile storage elements can include magnetic hard discs, optical discs, flash memories, or forms of electrically programmable memories (EPROM) or electrically erasable and programmable (EEPROM) memories.

Input/output interface 38 can be used to communicate information between system 10 and a hydraulic system controller, for example. In some embodiments, such information can include data processed by system 10, such as, for example, alert signals. Input/output interface 38 can also include a communications module. Input/output interface 38, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User interface 42 can be used to communicate information between hydraulic-fitting fatigue determination system 10 and a user. In some embodiments, such information can include fatigue conditions and/or strain cycle data. In some embodiments, such information can include data processed by hydraulic-fitting fatigue determination system 10, such as, for example, alert signals. User interface 42 can include various input devices, such as, for example, a keyboard, a mouse, a touch sensitive screen, etc. User interface 42 can include various output devices, such as, for example, a display screen, indicator lamps, audio devices, etc.

Figure 4:
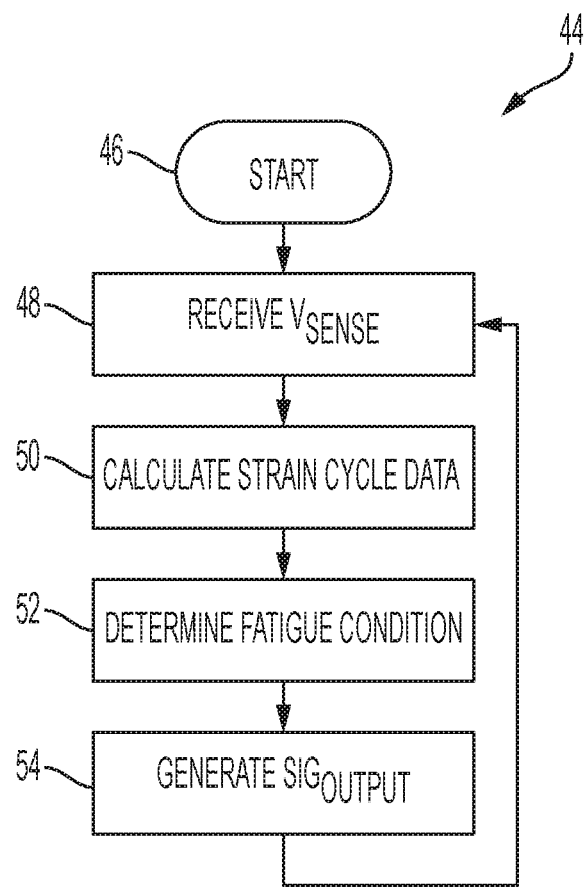
FIG. 4 is a flowchart of a method for evaluating a fatigue condition of a hydraulic fitting.

FIG. 4 is a flowchart of a method for evaluating a fatigue condition of hydraulic fitting 12, and therefore, of associated hydraulic system 13 (not shown in FIG. 4). In FIG. 4, method 44 is given from the perspective of processor 36 depicted in FIG. 3. Method 44 begins at step 46. At step 48, processor 36 receives a time sequence of signals $V_{SENSE}$ generated by strain gauge 14 (depicted in FIGS. 1 and 3). Then, at step 48, processor 36 calculates strain cycle data based on the time sequence of signals indicative of strain of the hydraulic fitting. This strain gauge data can be calculated using any of the methods described with respect to FIG. 2 above, for example. Then, at step 50, processor 36 determines a fatigue condition of hydraulic fitting 12 based on the strain cycle data calculated. Then, at step 52, processor 36 generates an output signal indicative of the fatigue condition determined. After step 52, processor 36 returns to step 48, where processor 36 receives more of the time sequence of signals $V_{SENSE}$ generated by strain gauge 14.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method of monitoring health of a system, comprising: monitoring pressure within the system; counting a number of times pressure in the system has exceeded at least one threshold; and determining when a potential fatigue condition may occur based on the number of times pressure in the system has exceeded the at least one threshold.

The method of the preceding paragraph can optionally include, additionally and/or alternatively, any one or more of the following features, configurations and/or additional components:

A further embodiment of the foregoing method, wherein the system comprises a hydraulic system that includes a hydraulic fitting, and the method further comprises: generating, via a strain gauge affixed to the hydraulic fitting, a time sequence of signals indicative of strain of the hydraulic fitting; calculating, via a controller, strain cycle data based on the time sequence of signals; determining, via the controller, the fatigue condition based on the strain cycle data calculated; and generating, via the controller, an output signal indicative of the fatigue condition determined; wherein calculating, via the controller, the strain cycle data based on the time sequence of signals comprises counting, via the controller, a first number of strain cycles that the time sequence of signals crosses from below a first strain threshold to above the first strain threshold.

A further embodiment of the foregoing method, wherein determining, via the controller, the fatigue condition based on the strain cycle data calculated comprises: determining, via the controller, a first fatigue condition in response to a first count threshold exceeding the first number of strain cycles counted; and determining, via the controller, a second fatigue condition in response to the first number of strain cycles counted exceeding the first count threshold.

A further embodiment of the foregoing method, wherein the output signal is indicative of a fault code if the second fatigue condition is determined.

A further embodiment of the foregoing method, wherein the output signal is indicative of continuing operation if the first fatigue condition is determined.

A further embodiment of the foregoing method, wherein calculating, via the controller, the strain cycle data based on the time sequence of signals further comprises: counting, via the controller, a second number of strain cycles that the time sequence of signals crosses from below a second strain threshold to above the second strain threshold, the second strain threshold being greater than the first strain threshold.

A further embodiment of the foregoing method, wherein determining, via the controller, the fatigue condition based on the strain cycle data calculated comprises: determining, via the controller, a third fatigue condition in response to a second count threshold exceeding the second number of strain cycles counted; and determining, via the controller, a fourth fatigue condition in response to the second number of strain cycles counted exceeding the second count threshold.

A further embodiment of the foregoing method, wherein calculating, via the controller, the strain cycle data based on the time sequence of signals comprises: determining, via the controller, contiguous subsets of the time sequence of signals that are greater than a first strain threshold; and counting, via the controller, a first number of strain cycles that the time sequence of signals crosses from below the first strain threshold to above the first strain threshold.

A further embodiment of the foregoing method, wherein calculating, via the controller, the strain cycle data based on the time sequence of signals further comprises: determining, via the controller, a maxima of each of the contiguous subsets of the time sequence of signals that are greater than the first strain threshold; determining, via the controller, a fatigue value corresponding to each of the maxima determined; summing, via the controller, the fatigue values determined so as to obtain a summation result; and comparing, via the controller, the summation result with a fatigue threshold value.

A further embodiment of the foregoing method, wherein calculating, via the controller, the strain cycle data based on the time sequence of signals further comprises: determining, via the controller, a maxima and a minima of the time sequence of signals; determining, via the controller, fatigue values corresponding to maxima/minima pairs; summing, via the controller, the fatigue values determined so as to obtain a summation result; and comparing, via the controller, the summation result with a fatigue threshold value.

A system for monitoring health of a hydraulic system, the system comprising: a strain gauge affixed to a hydraulic fitting in the system, the strain gauge configured to monitor pressure within the system; and a controller configured to: count a number of times pressure in the system has exceeded at least one threshold; and determine when a potential fatigue condition may be occur based on the number of times pressure in the system has exceeded the at least one threshold.

The system of the preceding paragraph can optionally include, additionally and/or alternatively, any one or more of the following features, configurations and/or additional components:

A further embodiment of the foregoing system, wherein: the strain gauge is configured to generate a time sequence of signals indicative of strain of the hydraulic fitting; the strain of the hydraulic fitting is indicative of pressure within the system; the controller is communicatively coupled to the strain gauge; and the controller is further configured to: receive, from the strain gauge, the time sequence of signals indicative of strain by counting a first number of strain cycles that the time sequence of signals crosses from below a first strain threshold to above the first strain threshold; calculate strain cycle data based on the time sequence of signals indicative of strain; determine the fatigue condition based on the strain cycle data calculated; and generate an output signal indicative of the fatigue condition determined.

A further embodiment of the foregoing system, wherein the controller is further configured to: determine a first fatigue condition in response to a first count threshold exceeding the first number of strain cycles counted; and determine a second fatigue condition in response to the first number of strain cycles counted exceeding the first count threshold.

A further embodiment of the foregoing system, wherein the output signal is indicative of a fault code if the second fatigue condition is determined.

A further embodiment of the foregoing system, wherein the output signal is indicative of continuing operation if the first fatigue condition is determined.

A further embodiment of the foregoing system, wherein the controller is further configured to: count a second number of strain cycles that the time sequence of signals crosses from below a second strain threshold to above the second strain threshold, the second strain threshold being greater than the first strain threshold.

A further embodiment of the foregoing system, wherein the controller is further configured to: determine a third fatigue condition in response to a second count threshold exceeding the second number of strain cycles counted; and determine a fourth fatigue condition in response to the second number of strain cycles counted exceeding the second count threshold.

A further embodiment of the foregoing system, wherein the controller is further configured to: determine contiguous subsets of the time sequence of signals that are greater than a first strain threshold; and count a first number of strain cycles that the time sequence of signals crosses from below a first strain threshold to above the first strain threshold.

A further embodiment of the foregoing system, wherein the controller is further configured to: determine a maxima of each of the contiguous subsets of the time sequence of signals that are greater than the first strain threshold; determine a fatigue value corresponding to each of the maxima determined; sum the fatigue values determined so as to obtain a summation result; and compare the summation result with a fatigue threshold value.

A further embodiment of the foregoing system, wherein the controller is further configured to: determine a maxima and a minima of the time sequence of signals; determine fatigue values corresponding to maxima/minima pairs; sum the fatigue values determined so as to obtain a summation result; and compare the summation result with a fatigue threshold value.

The invention claimed is:

1. A method of monitoring health of a system, comprising:
    monitoring, via a processor, pressure within the system;
    generating, via a strain gauge affixed to a hydraulic fitting, a time sequence of signals indicative of strain of the hydraulic fitting; and
    either:
        counting, via the processor, a number of times the pressure in the system has exceeded a first threshold;
        counting, via the processor, a number of times the pressure in the system has exceeded a second threshold; and
        determining, via the processor, when a potential fatigue condition may occur based on the number of times the pressure in the system has exceeded the first threshold and the number of times the pressure in the system has exceeded the second threshold;

and/or:

determining, via the processor, a sequence of alternating maxima and minima of the time sequence of signals;

determining, via the processor, fatigue values corresponding to adjacent maxima/minima pairs of the sequence of alternating maxima and minima;

summing, via the processor, the fatigue values determined so as to obtain a summation result;

comparing, via the processor, the summation result with a fatigue threshold value so as to obtain a comparison result; and determining, via the processor, when the potential fatigue condition may occur based on the comparison result.

2. The method of claim 1, wherein the system comprises a hydraulic system that includes the hydraulic fitting, and the method further comprises:

calculating, via a controller, strain cycle data based on the time sequence of signals;

determining, via the controller, the potential fatigue condition based on the strain cycle data; and generating, via the controller, an output signal indicative of the potential fatigue condition;

wherein calculating, via the controller, the strain cycle data based on the time sequence of signals comprises counting, via the controller, a first number of strain cycles that the time sequence of signals crosses from below a first strain threshold to above the first strain threshold.

3. The method of claim 2, wherein determining, via the controller, the potential fatigue condition based on the strain cycle data comprises:

determining, via the controller, a first fatigue condition in response to a first count threshold exceeding the first number of strain cycles; and determining, via the controller, a second fatigue condition in response to the first number of strain cycles exceeding the first count threshold.

4. The method of claim 3, wherein the output signal is indicative of a fault code if the second fatigue condition is determined.

5. The method of claim 3, wherein the output signal is indicative of continuing operation if the first fatigue condition is determined.

6. The method of claim 2, wherein calculating, via the controller, the strain cycle data based on the time sequence of signals further comprises:

counting, via the controller, a second number of strain cycles that the time sequence of signals crosses from below a second strain threshold to above the second strain threshold, the second strain threshold being greater than the first strain threshold.

7. The method of claim 6, wherein determining, via the controller, the potential fatigue condition based on the strain cycle data comprises:

determining, via the controller, a third fatigue condition in response to a second count threshold exceeding the second number of strain cycles; and determining, via the controller, a fourth fatigue condition in response to the second number of strain cycles exceeding the second count threshold.

8. The method of claim 2, wherein calculating, via the controller, the strain cycle data based on the time sequence of signals comprises:

determining, via the controller, contiguous subsets of the time sequence of signals that are greater than the first strain threshold; and counting, via the controller, the first number of strain cycles that the time sequence of signals crosses from below the first strain threshold to above the first strain threshold.

9. A system for monitoring health of a hydraulic system, the system comprising:

a strain gauge affixed to a hydraulic fitting in the hydraulic system, the strain gauge configured to monitor pressure within the hydraulic system and to generate a time sequence of signals indicative of strain of the hydraulic fitting; and a controller configured to:

either:

count a number of times the pressure in the hydraulic system has exceeded a first threshold;

count a number of times the pressure in the hydraulic system has exceeded a second threshold; and determine when a potential fatigue condition may occur based on the number of times the pressure in the hydraulic system has exceeded the first threshold and the number of times the pressure in the system has exceeded the second threshold;

and/or:

determine a sequence of alternating maxima and minima of the time sequence of signals;

determine fatigue values corresponding to adjacent maxima/minima pairs of the sequence of alternating maxima and minima;

sum the fatigue values determined so as to obtain a summation result;

compare the summation result with a fatigue threshold value so as to obtain a comparison result; and determine when the potential fatigue condition may occur based on the comparison result.

10. The system of claim 9, wherein:

the strain of the hydraulic fitting is indicative of the pressure within the hydraulic system;

the controller is communicatively coupled to the strain gauge; and the controller is further configured to:

receive, from the strain gauge, the time sequence of signals indicative of strain by counting a first number of strain cycles that the time sequence of signals crosses from below a first strain threshold to above the first strain threshold;

calculate strain cycle data based on the time sequence of signals indicative of strain;

determine the potential fatigue condition based on the strain cycle data; and generate an output signal indicative of the potential fatigue condition.

11. The system of claim 10, wherein the controller is further configured to:

determine a first fatigue condition in response to a first count threshold exceeding the first number of strain cycles; and determine a second fatigue condition in response to the first number of strain cycles exceeding the first count threshold.

12. The system of claim 11, wherein the output signal is indicative of a fault code if the second fatigue condition is determined.

13. The system of claim 11, wherein the output signal is indicative of continuing operation if the first fatigue condition is determined.

14. The system of claim 10, wherein the controller is further configured to:
- count a second number of strain cycles that the time sequence of signals crosses from below a second strain threshold to above the second strain threshold, the second strain threshold being greater than the first strain threshold.

15. The system of claim 14, wherein the controller is further configured to:
- determine a third fatigue condition in response to a second count threshold exceeding the second number of strain cycles; and
- determine a fourth fatigue condition in response to the second number of strain cycles exceeding the second count threshold.

16. The system of claim 10, wherein the controller is further configured to:
- determine contiguous subsets of the time sequence of signals that are greater than the first strain threshold; and
- count the first number of strain cycles that the time sequence of signals crosses from below the first strain threshold to above the first strain threshold.

* * * * *